United States Patent [19]

Eichenauer et al.

[11] Patent Number: 4,959,410

[45] Date of Patent: Sep. 25, 1990

[54] POLYMER MIXTURES HAVING HIGH TENSILE STRENGTH AND GOOD TEAR PROPAGATION RESISTANCE

[75] Inventors: Herbert Eichenauer; Edgar Leitz, both of Dormagen; Karl-Heinz Ott, Leverkusen; Christian Lindner, Cologne; Lothar Meier, Spockhoevel; Otto Billinger, Rhein, all of Fed. Rep. of Germany

[73] Assignee: Bayer Aktiengesellschaft, Leverkusen-Bayerwerk, Fed. Rep. of Germany

[21] Appl. No.: 318,972

[22] Filed: Mar. 6, 1989

[30] Foreign Application Priority Data

Mar. 17, 1988 [DE] Fed. Rep. of Germany ....... 3808843

[51] Int. Cl.$^5$ .................... C08L 69/00; C08L 55/02; C08L 51/04; C08L 35/00
[52] U.S. Cl. ....................................... 525/67; 525/92; 525/186; 525/413; 525/415
[58] Field of Search ...................... 525/67, 74, 186, 92

[56] References Cited

U.S. PATENT DOCUMENTS 3,639,503  2/1972  Matzer ................... 525/415

FOREIGN PATENT DOCUMENTS 0222234  5/1987  European Pat. Off. .

Primary Examiner—Melvyn I. Marquis
Assistant Examiner—David Buttner
Attorney, Agent, or Firm—Connolly and Hutz

[57] ABSTRACT

Polymer mixtures having high tensile strength and good tear propagation resistance, consisting of
(A) from 10 to 95 parts by weight of a graft polymer,
(B) from 0 to 75 parts by weight of a thermoplastic resin component and
(C) from 5 to 60 parts by weight of a copolymer having a sequence type of structure corresponding to the idealized formula (I)

$$(A-X-B)_n \quad (I)$$

wherein
A = polymer of a cyclic carbonate,
B = polymer of another cyclic ester and
X = middle member containing partial structures of both A and B.

4 Claims, No Drawings

POLYMER MIXTURES HAVING HIGH TENSILE STRENGTH AND GOOD TEAR PROPAGATION RESISTANCE

This invention relates to soft, rubber-like, flexible polymer mixtures which can easily be processed and moulded thermoplastically without requiring typical rubber processing steps such as vulcanization.

Flexible polymer alloys based on graft rubbers are known see e.g. EP-A 0 122 516). These mixtures have, however, insufficient tensile strength and tear propagation resistance.

It has now been found that polymer mixtures which have excellent combinations of properties which are capable of being adjusted to their particular purpose or use are obtained by adding a specific copolymer with a sequence structure (I). The said mixtures also have excellent thermoplastic processibility, good solvent resistance and high strength of adherence to other plastics materials.

The present invention relates to polymer mixtures having high tensile strength and good tear propagation resistance, comprising (A) from 10 to 95 parts by weight, preferably from 20 to 90 parts by weight, of a graft polymer of from 40 to 85% by weight, preferably from 45 to 80% by weight, of a particulate, highly-cross-linked diene or alkylacrylate rubber and from 60 to 15% by weight, preferably from 55 to 20% by weight, of graft polymerised alkylakrylates, alkylmethacrylates, acrylonitrile, methacrylonitrile, styrene, α-methylstyrene or mixtures thereof, (B) from 0 to 75 parts by weight, preferably from 5 to 70 parts by weight, of a thermoplastic polymer of alkylacrylates, alkylmethacrylates, acrylonitrile, methacrylonitrile, styrene, α-methylstyrene or mixtures thereof (C) from 5 to 60 parts by weight, preferably from 5 to 50 parts by weight, of a copolymer having a sequence type of structure (sequential copolymer) corresponding to the idealized formula (I)

$$(A-X-B)_n \qquad (I)$$

wherein n=1 to 20, preferably 1 to 10, and A=a polymer of a cyclic carbonate corresponding to formula (II) ("Block A")

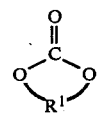
(II)

wherein
$R^1$=—$(CH_2)_n$— wherein n=3–12,
—$CH_2CH_2CH(CH_3)$—, —$CH_2CH_2OCH_2CH_2$—,
—$CH_2CH_2OCH_2CH_2OCH_2CH_2$—,
—$CH_2CH(CH_3)CH_2CH_2C(CH_3)_2CH_2$—,

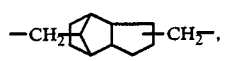

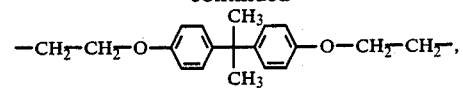

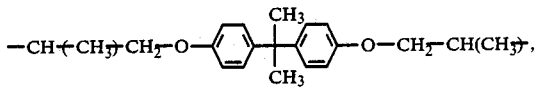

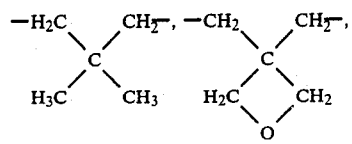

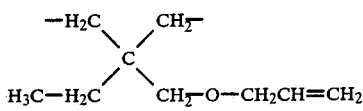

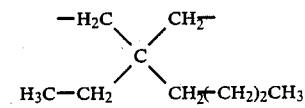

or to formula (III)

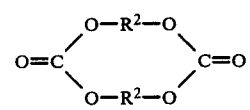
(III)

wherein
$R^2$=—$(CH_2)_n$ where n=4–12, —$CH_2CH_2OCH_2CH_2$—, —$CH_2CH_2OCH_2CH_2OCH_2CH_2$;

B=a polymer of a cyclic ester corresponding to formula (IV) ("Block B")

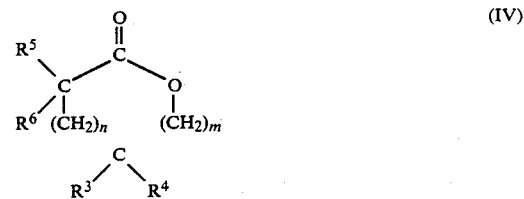
(IV)

wherein
$R^3R^4$, $R^5$ and $R^6$=H, $C_1$–$C_6$-alkyl, $C_3$–$C_6$-alkenyl, $C_1$–$C_6$-alkoxy or $C_1$–$C_6$-alkenoxy-$C_1$–$C_6$-alkyl, in particular H, $CH_3$ or $C_2H_5$, and m and n denote, independently of one another, 0, 1, 2, 3, 4, 5 or 6, X=the middle member containing both the cyclic carbonate corresponding to formula (II) and/or (III) and the cyclic ester corresponding to formula (IV) in polymerised form, the concentration of the structural units of compounds (II) and/or (III) continuously decreasing in the direction of —B— and the concentration of the structural units of the compounds (IV) continuously decreasing in the direction of —A— ("tapered structure"), the proportion of blocks A amounting to from 1 to 45% by weight, preferably from 2.5 to 30% by weight (based on the total quantity of blocks A+B), the proportion of blocks B amounting to 99 to 55% by weight, preferably from 97.5 to 70% by weight (based on the total quantity of blocks A+B) and the proportion of middle members X amounting to from 5 to 95% by weight, preferably from 10 to 80% by weight (based on the total quantity of A+B+X).

The graft polymers (A) are preferably particulate emulsion polymerisation graft polymers. They consist of a particulate rubber (diene rubber or alkyl acrylate rubber) having a gel content preferably greater than 70% by weight and average particle diameters ($d_{50}$ determined by ultracentrifuge measurements according to W. Scholtan et al, Kolloid-Z. u. Z., Polymere 250 (1972), 782–795) of from 0.05 to 2.0 μm, preferably from 0.1 to 0.8 μm, (grafting base) and a graft polymerised polymer of alkylacrylate or alkylmethacrylate, e.g. methyl methacrylate, styrene, α-methylstyrene, styrene substituted in the nucleus, e.g. p-methylstyrene, methacrylonitrile, maleic acid anhydride, N-substituted maleimide, vinyl acetate or mixtures thereof (grafting superstrate).

The diene rubbers may be polybutadiene, polyisoprene and copolymers of butadiene with up to 35% by weight of comonomers such as styrene, acrylonitrile, methylmethacrylate or $C_1$–$C_6$-alkylacrylate which are produced by aqueous radical emulsion polymerisation. The acrylate rubbers may be cross-linked, particulate emulsion copolymers substantially of $C_1$–$C_8$-alkylacrylate, in particular $C_2$–$C_6$-alkylacrylate, optionally in admixture with up to 15% by weight of comonomers such as styrene, methylmethacrylate, butadiene, vinyl methyl ether or acrylonitrile and optionally up to 5% by weight of a polyfunctional crosslinking comonomer, e.g. divinylbenzene, glycol-bis-acrylates, bisacrylamides, phosphoric acid triallylester, citric acid triallylester, allylesters of acrylic acid or methacrylic acid, triallylcyanurate, triallylisocyanurate. Also suitable are mixtures of diene- and alkylacrylate rubbers and rubbers which have a so-called core/sheath structure, e.g. a core of diene rubber and a sheath of acrylate or vice versa. Core/sheath rubbers are preferred.

Preferred graft superstrates include copolymers of styrene and acrylonitrile, copolymers of α-methylstyrene and acrylonitrile and methylmethacrylate polymers or copolymers with up to 50% by weight of $C_1$–$C_6$-alkylacrylates, acrylonitrile or styrene.

To prepare the graft polymers A, an emulsion of rubber particles is first produced by emulsion polymerisation. At least one vinyl monomer is then radically graft polymerised in known manner in the presence of the rubber emulsion so that at least a proportion of the monomers is graft polymerised on the rubber.

Thermoplastic polymers (B) are resinous, thermoplastic polymers of styrene, α-methylstyrene, styrenes substituted in the nucleus such as p-methylstyrene, methyl acrylate, methylmethacrylate, acrylonitrile, methacrylonitrile, maleic acid anhydride, N-substituted maleimide, vinyl acetate or mixtures thereof. Styrene/acrylonitrile copolymers, α-methylstyrene/acrylonitrile copolymers and methylmethacrylate/acrylonitrile copolymers are preferred.

The thermoplastic polymers (B) are known and may be prepared by radical polymerisation, in particular by emulsion, suspension, solution or bulk polymerisation. They preferably have molecular weights $\overline{M}_w$ of from 20,000 to 200,000 and limiting viscosity numbers [η] of from 20 to 110 ml/g (determined in dimethylformamide at 25° C.).

The sequential polymers (C) corresponding to the idealized formula (I)

$$(A—X—B)_n \qquad (I)$$

wherein
n=1 to 20, in particular 1 to 10, and
—A—=a polymer of a cyclic carbonate corresponding to formula (II) ( Block A")

wherein
$R^1$=—$(CH_2)_n$— wherein n=3–12
—$CH_2CH_2CH(CH_3)$—, —$CH_2CH_2OCH_2CH_2$—, —$CH_2CH_2OCH_2CH_2OCH_2CH_2$—,
—$CH_2CH(CH_3)CH_2CH_2C(CH_3)_2CH_2$—,

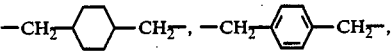

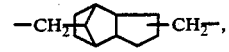

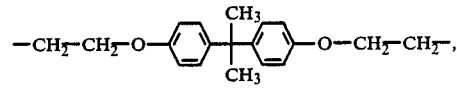

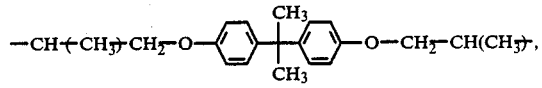

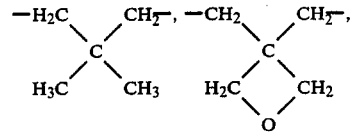

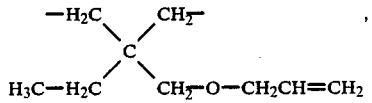

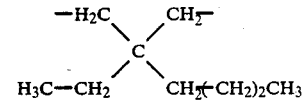

or corresponding to formula (III)

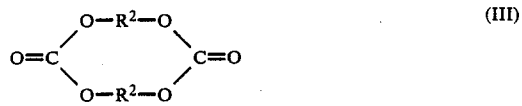

wherein
$R^2$=—$(CH_2)_n$ wherein 4–12 —$CH_2CH_2OCH_2CH_2$— —$CH_2CH_2OCH_2CH_2OCH_2CH_2$—
—B—=a polymer of a cyclic ester corresponding to formula (IV) ("Block B")

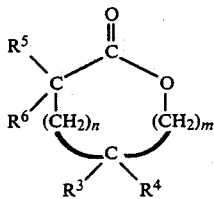

(IV)

wherein $R^3$, $R^4$, $R^5$ and $R^6$ = H, $C_1$–$C_6$-alkyl, $C_3$–$C_6$-alkenyl, $C_1$–$C_6$-alkoxy or $C_1$–$C_6$-alkenoxy-$C_1$–$C_6$-alkyl, in particular H, $CH_3$ or $C_2H_5$, and m and n denote, independently of one another, 0, 1, 2, 3, 4, 5 or 6, X = the middle member containing both the cyclic carbonate corresponding to formula (II) and/or (III) and the cyclic ester corresponding to formula (IV) in polymerised form, the concentration of the structural units of compounds (II) and/or (III) continuously decreasing in the direction of —B— and the concentration of the structural units of compounds (IV) continuously decreasing in the direction of —A— ("tapered structure").

The proportion of blocks A in sequential copolymer C amounts to from 1 to 45% by weight, preferably from 2.5 to 30% by weight (based in each case on the total quantity of blocks A+B), the proportion of blocks B amount to from 99 to 55% by weight, preferably from 97.5 to 70% by weight (based in each case on the total quantity of blocks A+B) and the proportion of middle members X amounts to from 5 to 95% by weight, preferably from 10 to 80% by weight (based on the total quantity of A+B+X).

The average molecular weights of blocks A and B are from 500 to 1,000,000, preferably from 1000 to 500,000 and most preferably from 2000 to 250,000; the average molecular weights of the middle members X are from 300 to 20,000, preferably from 500 to 15,000.

Preferred cyclic carbonates (II) and (III) include trimethylene glycol carbonate, neopentyl glycol carbonate, 1,4-butanediol carbonate and dimeric carbonates of pentanediol or of hexanediol. Neopentylglycol carbonate is particularly preferred. ε-Caprolactone and pivalolactone are preferred lactones (IV).

The sequential copolymers (I) may be prepared from the cyclic carbonates (II, III) and lactones (IV) by anionic ring opening solution polymerization. A sequential structure of the copolymers is achieved by stepwise addition of the carbonate/lactone mixture to the polymerisation active solution.

Preferred sequential copolymers (C) are products with molecular weights $\overline{M}_w$ in the range of from 2000 to 500,000, preferably from 5000 to 400,000, obtained according to DE-OS No. 3 700 193.

The mixtures of (A), (B) and (C) optionally contain conventional additives such as flame-retardants, lubricants, stabilizers, pigments, mould release agents and antistatic agents.

The polymer mixtures may be prepared by the usual methods, e.g. graft polymer (A) which has been isolated from its emulsion by a conventional coagulation process or a direct drying process (spray drying) and purified may be mixed with thermoplastic polymer B and the sequential copolymer (C) and optionally additives of the type mentioned above by means of known compounding apparatus (kneaders, screws, rollers).

Moulding compounds obtained from the polymer mixtures according to the invention have many of the properties of conventional rubbers and of thermoplastic elastomers but their exceptional combination of high tensile strength and good tear propagation resistance should be particularly mentioned. These mechanical properties may be varied and the hardness modified by variation of the proportions of (A), (B) and (C) and in particular by the composition of polymer component (C). Compared with known moulding compounds which have elastoplastic properties, the moulding compounds obtained here contain only very small proportions of volatile or migrating impurities. Their good resistance to solvents is also an outstanding quality.

The moulding compounds are suitable in particular for the production of coatings, sealing compounds, cable sheathing compounds, sheet products, damping or attenuating materials, and rubber articles such as e.g. hoses.

EXAMPLES

Graft polymer (A)

Graft product obtained by emulsion polymerization of 50% by weight of a styrene/acrylonitrile mixture (ratio by weight 72:28) on 50% by weight of particulate polybutadiene having an average particle diameter ($d_{50}$) of 0.4 μm.

Thermoplastic copolymer (B)

Statistic styrene/acrylonitrile copolymer (weight ratio styrene: acrylonitrile=72:28) having a molecular weight $\overline{M}_w$ of about 95,000 and a heterogenity index $M_w/M_n \leq 2.0$.

Sequentially structured copolymer (C)

C 1: Sequentially structured copolymer of the type A—X—B wherein A stands for polyneopentylglycol carbonate and B stands for poly-ε-caprolactone. X denotes a tapered transition segment of neopentyl glycol carbonate and ε-caprolactone. The copolymer was obtained by ring opening anionic copolymerization of neopentylglycol carbonate and ε-caprolactone. The ratio by weight of the monomers neopentylglycol carbonate and ε-caprolactone in the copolymer amounts to 10:90 (determined by $^1$H-NMR spectroscopy). The relative solution viscosity $\eta_{rel}$ of the polymer is 2.71 (2% by weight solution in $CH_2Cl_2$ at 20° C.)

C 2: same as C 1, ratio by weight of neopentylglycol carbonate to ε-caprolactone=30:70; $\eta_{rel}$=2.71 (2% by weight solution in $CH_2Cl_2$ at 20° C.).

The mixtures of (A), (B) and (C) were made by compounding for 5 minutes on a roller at 195° C. with the addition of 0.5 parts by weight of a silicone oil as processing aid. The rolled sheet obtained was then compressed at 195° C. to form boards from which test samples were taken.

The compositions and the test data obtained are summarized in Table 1.

Test standards:

| Tensile strength | (MPa) | DIN 53 455 |
|---|---|---|
| Elongation | (%) | DIN 53 455 |
| Tear propagation resistance | (MPa) | DIN 53 515 |
| Shore hardness | | DIN 53 505 |

TABLE 1

Compositions and test data of the moulding compounds

| Example No. | A | B | C1 | C2 | Tensile strength MPa | Elongation % | Tear propagation resistance MPa | Shore hardness A/D |
|---|---|---|---|---|---|---|---|---|
| 1. | 50 | 50 | 20 | — | 18.8 | 114 | 89 | 98/60 |
| 2. | 70 | 30 | 30 | — | 15.8 | 253 | 51 | 96/39 |
| 3. | 50 | 50 | — | 20 | 17.3 | 44 | 86 | 97/57 |
| 4. (Comparison) | 50 | 50 | — | — | 11.1 | 55 | 69 | 100/71 |

We claim:

1. Polymer mixtures having high tensile strength and good tear propagation resistance comprising
   (A) from 10 to 95 parts by weight of a graft polymer of from 40 to 85% by weight of a particulate, highly cross-linked diene- or alkylacrylate-rubber and from 60 to 15% by weight of graft polymerised alkylacrylates, alkylmethacrylates, acrylonitrile, methacrylonitrile, styrene, styrene-substituted in the nucleus, α-methylstyrene, maleic acid anhydride, N-substituted maleimide, vinyl acetate and mixtures thereof.
   (B) from 0 to 75 parts by weight of a thermoplastic polymer of alkylacrylates, alkylmethacrylates, acrylonitrile, methacrylonitrile, styrene, α-methylstyrene or mixtures thereof, and
   (C) from 5 to 60 parts by weight of a copolymer having a sequential structure corresponding to the idealized formula (I)

$(A-X-B)_n$      (I)

wherein
   n=1 to 20 and
   A=a polymer of a cyclic carbonate corresponding to formula (II) ("Block A")

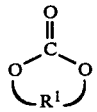  (II)

wherein
   $R^1 = -(CH_2)_n-$ wherein n=3-12, $-CH_2CH_2CH(CH_3)-$, $-CH_2CH_2OCH_2CH_2-$, $-CH_2CH_2OCH_2CH_2OCH_2CH_2-$, $-CH_2CH(CH_3)CH_2CH_2C(CH_3)_2CH_2-$,

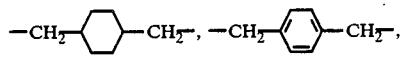

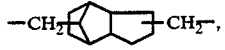

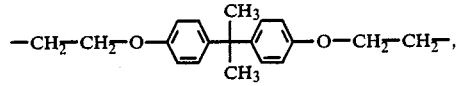

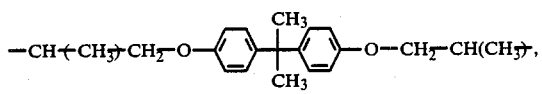

-continued

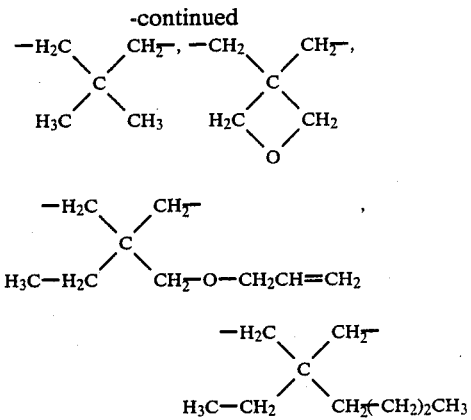

or corresponding to formula (III)

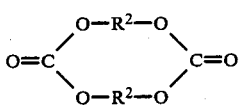  (III)

wherein
   $R^2 = -(CH_2)_n$ wherein n=4-12, $-CH_2CH_2OCH_2-CH_2-$ $-CH_2CH_2OCH_2CH_2OCH_2CH_2-$
   B=a polymer of a cyclic ester corresponding to formula (IV) ("Block B")

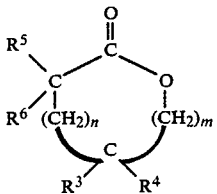  (IV)

wherein
   $R^3$, $R^4$, $R^5$, $R^6$=H, $C_1$-$C_6$-alkyl, $C_3$-$C_6$-alkenyl, $C_1$-$C_6$-alkoxy or $C_1$-$C_6$-alkenoxy-$C_1$-$C_6$-alkyl, in particular H, $CH_3$ or $C_2H_5$ and
   m and n denote, independently of one another, 0, 1, 2, 3, 4, 5 or 6, and
   X=the middle member containing both the cyclic carbonate corresponding to formula (II) or (III) or both and the cyclic ester corresponding to formula (IV) in polymerised form, the concentration of the structural units of compounds (II) or (III) or both continuously decreasing in the direction of —B— and the concentration of the structural units of compounds (IV) continuously decreasing in the direction of —A— ("tapered structure") and the proportion of blocks A amounting to from 1 to 45% by weight, based on the total quantity of blocks (A+B), the proportion of blocks B amounting from 99 to 55% by weight, based on the total quantity of blocks (A+B) and the proportion of middle members X amounting to from 5 to 95% by weight, based on the total quantity of A+B+X.

2. Polymer mixtures according to claim 1, containing as (C), a polymer prepared by anionic ring opening polymerisation.

3. Polymer mixtures according to claim 1, containing as (C), a copolymer of from 1 to 45% by weight of neopentyl glycol carbonate and from 99 to 55% by weight of ε-caprolactone.

4. A flexible sheet having high tensile strength and tear propagation resistance made from a polymer according to claim 1.

* * * * *